US011491843B2

(12) United States Patent
Williams et al.

(10) Patent No.: US 11,491,843 B2
(45) Date of Patent: Nov. 8, 2022

(54) REAR CABIN THERMAL MANAGEMENT SYSTEMS AND METHODS

(71) Applicant: TOYOTA MOTOR ENGINEERING & MANUFACTURING NORTH AMERICA, INC., Plano, TX (US)

(72) Inventors: Patrick P. Williams, Novi, MI (US); David W. Cosgrove, Milford, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 837 days.

(21) Appl. No.: 16/411,085

(22) Filed: May 13, 2019

(65) Prior Publication Data

US 2020/0361281 A1 Nov. 19, 2020

(51) Int. Cl.
*G06F 7/00* (2006.01)
*B60H 1/00* (2006.01)

(52) U.S. Cl.
CPC ..... *B60H 1/00642* (2013.01); *B60H 1/00278* (2013.01); *B60H 1/00385* (2013.01); *B60H 1/00742* (2013.01); *B60H 1/00885* (2013.01)

(58) Field of Classification Search
CPC ............ B60H 1/00642; B60H 1/00278; B60H 1/00385; B60H 1/00742; B60H 1/00885

USPC ......................................................... 701/36
See application file for complete search history.

(56) References Cited

U.S. PATENT DOCUMENTS

| 7,890,218 B2 * | 2/2011 | Adams ................. H02J 7/0044 |
| | | 320/136 |
| 10,118,460 B1 | 11/2018 | Blatchley |
| 2016/0339760 A1 * | 11/2016 | Dunn ................... H01M 10/625 |
| 2017/0087957 A1 | 3/2017 | Blatchley |
| 2018/0097266 A1 | 4/2018 | Jalilevand |

* cited by examiner

*Primary Examiner* — Davis D Hwu
(74) *Attorney, Agent, or Firm* — Sheppard, Mullin, Richter & Hampton LLP; Hector A. Agdeppa; Daniel N. Yannuzzi

(57) ABSTRACT

Systems and methods for mitigating a thermal impact on a vehicle cabin caused by a battery thermal-management system, include determining a status of vehicle climate control system; determining whether a battery thermal-management system of the vehicle is operating above a determined threshold; and if the vehicle climate control system is active and the battery thermal-management system of the vehicle is operating above the determined threshold, adjusting at least one of a plurality of cabin temperature control parameters to mitigate a thermal impact of the battery thermal-management system on a rear portion of the vehicle cabin.

24 Claims, 4 Drawing Sheets

REAR CABIN THERMAL MANAGEMENT SYSTEMS AND METHODS

TECHNICAL FIELD

The present disclosure relates generally to vehicular technology. More particularly, various embodiments relate to systems and methods for adjusting vehicle parameters to offset rear-cabin thermal impact resulting from battery cooling.

DESCRIPTION OF RELATED ART

Increases in fuel prices and concerns about the consumption of fossil fuel in general have led consumers to demand more fuel-efficient vehicles. (Corporate Average Fuel Economy) CAFE regulations also mandate fuel economy standards for vehicle manufacturers selling vehicles in the United States. Accordingly, automobile designers have sought out new ways to improve the fuel economy of their vehicles.

One such way automobile manufacturers have improved average fuel economy is to offer hybrid electric vehicles as part of their lineup. Hybrid electric vehicles, sometimes referred to as HEVs, combine an electric powertrain with an internal combustion engine (ICE) to provide motive force for the vehicle. This combination can be used, for example, to operate the vehicle in an electric-only mode (e.g., for short distances or in stop-and-go traffic), in an ICE-only mode such as for highway driving, or in a combined mode such as for greater acceleration.

A parallel design is common in many hybrid electric vehicles. With a parallel design, the internal combustion engine or the electric motor can be used independently to drive the vehicle wheels, or they can be used to drive the wheels together. In a series hybrid design, only the electric motor is used to drive the wheels and an internal combustion engine serves primarily as a generator to provide electricity to extend the range by maintaining a charge on the batteries. Plug-in hybrids allow charging from an AC mains supply, which may ensure a full charge on the batteries and extend the electric-only range of the vehicle.

Electric vehicles and hybrid electric vehicles use large batteries to store the energy used to power the motors that drive the wheels. During vehicle operation, regenerative braking may be used to supply current to charge the batteries. This flow of current causes heating of the batteries in an amount that is generally proportional to the square of the current flowing in the internal resistance of the battery cells. The performance of the batteries is directly affected by the temperature. Temperatures that are either too cold or too hot can lead to damage of the battery cells. Battery temperature outside of the optical temperature range can affect battery power and the battery cycle life. Similarly, there should be an even temperature distribution in the battery system.

Accordingly, thermal management systems are generally included in electric and hybrid electric vehicles. Typically, a heat exchanger that removes heat from the batteries and releases it into the surrounding environment. For example, for a heat exchanger the overall heat transfer is provided by $$q = UA\Delta TM$$

Where q is the Heat transfer rate (W), U is the overall heat transfer coefficient [W/(m²·K)], A is the Heat transfer surface area [m²], and ΔTM is the approximate mean temperature differential [K]. The released heat from the battery can cause excess warming of the vehicle's cabin.

Battery ventilation systems may also be provided to exhaust hazardous gases that may accumulate within the battery pack. Such air systems may also provide a cooling function to the battery and may also transfer heat from the battery to the area surrounding the battery, which may also impact the cabin temperature.

BRIEF SUMMARY OF THE DISCLOSURE

According to various embodiments of the disclosed technology systems and methods may be configured to maintain a level of comfort in a rear cabin of a hybrid electric vehicle or an electric vehicle by adjusting vehicle parameters to offset a thermal impact on the rear cabin caused by battery thermal-management systems.

A method for mitigating a thermal impact on a vehicle cabin caused by a battery thermal-management system, the method may include: determining a status of vehicle climate control system; determining whether a battery thermal-management system of the vehicle is operating above a determined threshold; and if the vehicle climate control system is active and the battery thermal-management system of the vehicle is operating above the determined threshold, adjusting at least one of a plurality of cabin temperature control parameters to mitigate a thermal impact of the battery thermal-management system on a rear portion of the vehicle cabin. Determining whether a battery thermal-management system of the vehicle is operating above a determined threshold may further comprise determining whether a battery fan level is above a determined fan speed. The rear portion of the cabin of the vehicle may further comprise a second-row seating area of the vehicle or a third-row seating area of the vehicle or both.

In some embodiments the cabin temperature control parameters may further comprise at least one of a target air outlet temperature, a climate-control-system blower speed, a climate-control-system, cooled seat setting, a window shade setting and an electrochromatic window setting.

In some embodiments determining the status of the vehicle climate control system may further comprise determining at least one of whether a blower is turned on and whether a vehicle air conditioning system is turned on. In some embodiments determining the status of the vehicle climate control system may further comprise determining whether the vehicle climate control system is being used to cool the vehicle.

The method may further include determining whether a temperature of a vehicle battery pack is above a determined threshold temperature and not adjusting the plurality of cabin temperature control parameters unless the vehicle battery pack is above the determined threshold temperature.

The determined threshold for the battery thermal-management system may further comprise a threshold at or above which heat from the battery thermal-management system transfers sufficient heat to the cabin to cause an unwanted temperature impact to occur in the cabin.

The unwanted temperature impact may further include a temperature gradient between a front portion of the vehicle and the rear portion of the vehicle greater than a determined temperature differential amount.

The determined threshold for the battery thermal-management system may further include a determined operating level of the battery thermal-management system.

The method may further include determining whether the rear portion of the cabin of the vehicle is occupied by one or more passengers and adjusting the at least one of the one or more cabin temperature control parameters only if the rear portion of the cabin of the vehicle is occupied by one or more passengers.

A system for mitigating a thermal impact on a vehicle cabin caused by a battery thermal-management system may include a cabin temperature control circuit comprising a communications interface coupled to receive information from vehicle components, the cabin temperature control circuit configured to determine a status of vehicle climate control system, determine whether a battery thermal-management system of the vehicle is operating above a determined threshold, and if the vehicle climate control system is active and the battery thermal-management system of the vehicle is operating above the determined threshold, adjust at least one of a plurality of cabin temperature control parameters to mitigate a thermal impact of the battery thermal-management system on a rear portion of the vehicle cabin. In some embodiments the cabin temperature control parameters may further comprise at least one of a target air outlet temperature, a climate-control-system blower speed, a climate-control-system, cooled seat setting, a window shade setting and an electrochromatic window setting. Determining whether a battery thermal-management system of the vehicle is operating above a determined threshold may further comprise determining whether a battery fan level is above a determined fan speed.

In some embodiments determining the status of the vehicle climate control system may further comprise determining at least one of whether a blower is turned on and whether a vehicle air conditioning system is turned on. Determining the status of the vehicle climate control system may further comprise determining whether the vehicle climate control system is being used to cool the vehicle.

In some embodiments the cabin temperature control circuit may further be configured to determine whether a temperature of a vehicle battery pack is above a determined threshold temperature and not adjusting the plurality of cabin temperature control parameters unless the vehicle battery pack is above the determined threshold temperature.

In various embodiments the determined threshold for the battery thermal-management system may further include a threshold at or above which heat from the battery thermal-management system transfers sufficient heat to the cabin to cause an unwanted temperature impact to occur in the cabin.

In some embodiments the unwanted temperature impact may further include a temperature gradient between a front portion of the vehicle and the rear portion of the vehicle greater than a determined temperature differential amount.

In some embodiments the determined threshold for the battery thermal-management system may further comprise a determined operating level of the battery thermal-management system.

In some embodiments the rear portion of the cabin of the vehicle may further comprise a second-row seating area of the vehicle or a third-row seating area of the vehicle or both.

In some embodiments the cabin temperature control circuit is further configured to determine whether the rear portion of the cabin of the vehicle is occupied by one or more passengers and adjusting the at least one of the one or more cabin temperature control parameters only if the rear portion of the cabin of the vehicle is occupied by one or more passengers.

In some embodiments the vehicle components may further comprise at least one of a vehicle climate control system and the battery thermal management system.

A vehicle, you may include a battery pack, comprising one or more batteries; a battery thermal management system to control the temperature of one or more batteries of the battery pack; a climate control system; and a cabin temperature control circuit. The cabin temperature control circuit may include a communications interface coupled to receive information from the climate control system and the battery thermal management system, the cabin temperature control circuit configured to determine a status of vehicle climate control system, determine whether a battery thermal-management system of the vehicle is operating above a determined threshold, and if the vehicle climate control system is active and the battery thermal-management system of the vehicle is operating above the determined threshold, adjust at least one of a plurality of cabin temperature control parameters to mitigate a thermal impact of the battery thermal-management system on a rear portion of the vehicle cabin.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can be configured to maintain a level of comfort in a rear cabin of a hybrid electric vehicle or an electric vehicle by adjusting vehicle parameters to offset a thermal impact on the rear cabin caused by battery thermal-management systems.

Conventional vehicular technologies allow battery thermal-management systems to operate in the normal mode to control the operation of a vehicle's battery pack (e.g., one or more batteries) without considering the impact it may have on passenger comfort in general and rear passenger comfort in particular. Systems used to cool batteries in hybrid electric vehicles or electric vehicles can pull cool air from the cabin, or radiate, convect or conduct heat to the cabin. Current systems relying on a cabin-temperature sensor in the front of the cabin, such as on or near the dashboard, center stack or center console, might not effectively address rear cabin temperature increases caused by battery thermal-management systems. Accordingly, temperature gradients may occur such as from the front portion to the rear portion of the cabin and from the top portion to the bottom portion of the cabin.

Embodiments of the systems and methods disclosed herein may be implemented to adjust vehicle temperature-control parameters such as, for example, target air outlet (TAO) temperatures, fan speeds of the vehicle's climate-control system, other climate-control-system settings, temperature sensor locations, window shade or window tint settings, and so on. A cabin-temperature management system can be configured to monitor other vehicle parameters such as front and rear cabin temperatures (or front, middle and rear for a 3-row vehicle), battery-thermal-management-system settings are operating parameters to determine whether corrective action is taken to minimize, lessen or otherwise mitigate the impact of the battery thermal-management system on cabin temperature. The cabin-temperature management system can also be configured to control the vehicle's climate-control system or other vehicle systems to adjust the aforementioned temperature-control parameters as may be appropriate to mitigate the temperature impact.

Occupancy sensors such as, for example, image sensors, weight sensors or other sensors can be used to determine the presence and location of occupants in the vehicle and this information can be used to activate or withhold activating the cabin-temperature management system based on vehicle occupancy. For example, if there are no rear passengers in the vehicle it may not be necessary to activate the cabin-temperature management system to address rear-cabin warming caused by the battery thermal-management system.

Figure 1:
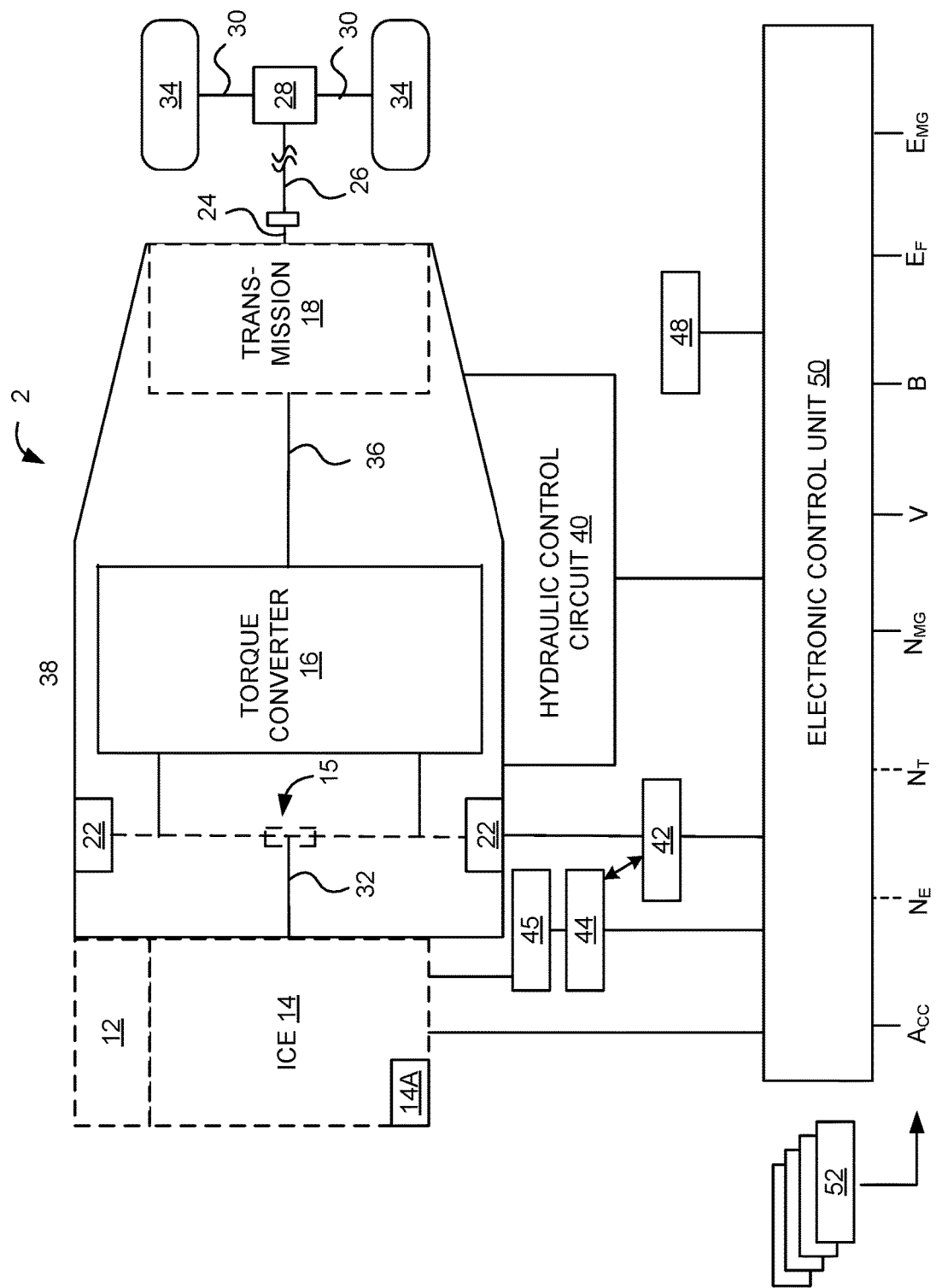
FIG. 1 is a schematic representation of an example vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motor-cycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods can be implemented in other types of vehicle including gasoline- or diesel-powered vehicles, fuel-cell vehicles, electric vehicles, or other vehicles in which battery thermal management can impact cabin comfort.

FIG. 1 illustrates a drive system of a vehicle that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/ pressure, B, battery SOC (i.e., the charged amount for battery 44 detected by an SOC sensor).

Accordingly, vehicle 102 can include a plurality of sensors 52 that can be used to detect various conditions internal or external to the vehicle and provide sensed conditions to electronic control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, and so on.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, other vehicles, parking spaces, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as an example of a vehicle with which embodiments of the disclosed technology may be implemented. One of ordinary skill in the art reading this description will understand how the disclosed embodiments can be implemented with other vehicle platforms.

Figure 2:
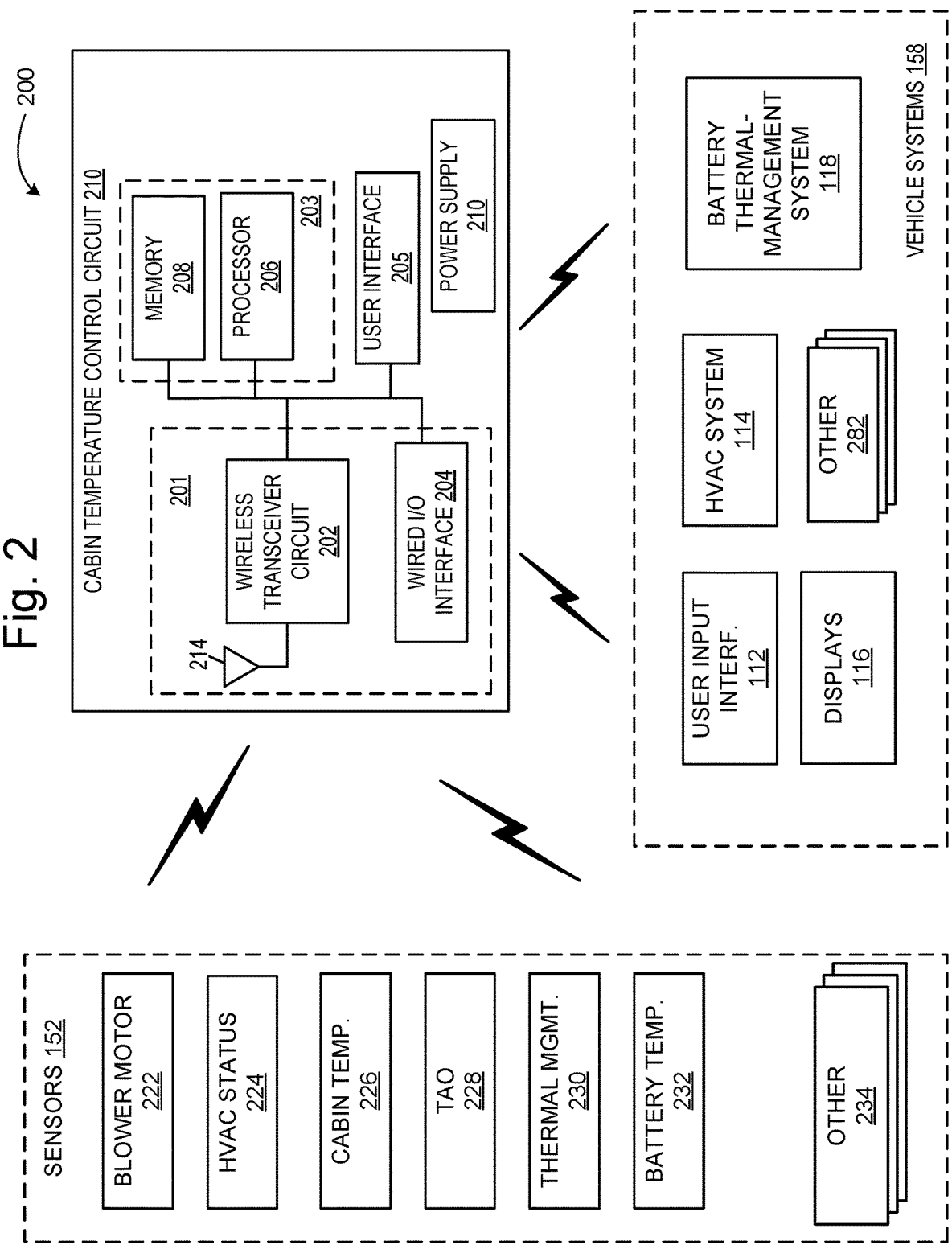
FIG. 2 illustrates an example architecture for a cabin-temperature management system in accordance with one embodiment of the systems and methods described herein.

FIG. 2 illustrates an example architecture for a cabin-temperature management system in accordance with one embodiment of the systems and methods described herein. Referring now to FIG. 2, in this example, cabin-temperature management system 200 includes an cabin-temperature control circuit 210, a plurality of sensors 152, and a plurality of vehicle systems 158. Sensors 152 and vehicle systems 158 can communicate with cabin-temperature control circuit 210 via a wired or wireless communication interface. Although sensors 152 and vehicle systems 158 are depicted as communicating with cabin-temperature control circuit 210, they can also communicate with each other as well as with other vehicle systems. In some embodiments, cabin-temperature control circuit 210 can be implemented as an ECU or as part of an ECU such as, for example electronic control unit 50. In other embodiments, cabin-temperature control circuit 210 can be implemented independently of the ECU. In yet further embodiments, cabin-temperature control circuit 210 may be implemented as part of the vehicle climate-control system (e.g., HVAC system 114).

Cabin-temperature control circuit 210 in this example includes a communication circuit 201, a decision circuit 203 (including a processor 206 and memory 208 in this example) and a power supply 212. Components of cabin-temperature control circuit 210 are illustrated as communicating with each other via a data bus, although other communication in interfaces can be included. Cabin-temperature control circuit 210 in this example also includes a user interface 205 such as an interface to receive a signal from a dash-mounted, console-mounted, or steering-wheel-mounted switch that can be operated by the user to activate or deactivate the cabin-temperature control circuit 210 manually.

Processor 206 can include a GPU, CPU, microprocessor, or any other suitable processing system. The memory 208 may include one or more various forms of memory or data storage (e.g., flash, RAM, etc.) that may be used to store setpoints, sensor readings, instructions and variables for processor 206 as well as any other suitable information. Memory 208, can be made up of one or more modules of one or more different types of memory, and may be configured to store data and other information as well as operational instructions that may be used by the processor 206 to cabin-temperature control circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a cabin-temperature control circuit 210.

Communication circuit 201 includes either or both a wireless transceiver circuit 202 with an associated antenna 214 and a wired I/O interface 204 with an associated hardwired data port (not illustrated). As this example illustrates, communications with cabin-temperature control circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by cabin-temperature control circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and $NiH_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or not otherwise be included on example vehicle 10. In the example illustrated in FIG. 2, sensors 152 blower motor sensor 222, HVAC status sensor 224, cabin temperature sensor 226, TAO sensor 228, battery thermal-management system sensor 230, battery temperature sensor 232. One or more of these sensors can be made up of an individual sensor or of multiple sensors. Additional sensors 234 can also be included as may be appropriate for a given implementation of cabin-temperature management system 200.

HVAC status sensor 224 may include one or more sensors to monitor the current status of a vehicle climate-control system such as, for example, HVAC system 114. These one or more sensors may be configured to monitor, for example, the HVAC system mode (e.g., on, off, heat, AC, etc.), temperature settings for the system and the like. Blower motor sensor 222 may include one or more sensors to monitor blower motor settings (e.g., fan-speed settings) of the HVAC system. Instead of or in addition to sensors, the same or similar information may be received directly from HVAC system 114.

Cabin temperature sensor 226 may include one or more sensors to monitor the temperature of the vehicle's cabin. For example, one or more sensors mounted in the cabin may monitor cabin temperature at one or more locations. TAO sensor 228 may be included to monitor a target air outlet temperature for the vehicle climate-control system. Instead of or in addition to sensors, the same or similar information may be received directly from the vehicle climate-control system (e.g., from HVAC system 114).

Thermal management sensor 230 may include one or more sensors to monitor the status or condition of the battery thermal-management system. For example, sensors may be included to monitor parameters such as system state (e.g., on/off/standby, and so on), system temperatures (e.g., battery temperatures, temperature at the exterior housing of the system), operational status (e.g., full cooling, moderate cooling, partial cooling, for heating, moderate heating, partial heating, and so on) and other system parameters. In addition, a battery temperature sensor 232 may include one or more sensors to monitor the temperature of the vehicle battery such as EV or HEV batteries, or other vehicle batteries.

Vehicle systems 158 can include any of a number of different vehicle components or subsystems used in operation of the vehicle. In this example, the vehicle systems 158 include a user input interface 112 such as, for example, one or more of buttons, switches, touchscreen displays, voice command systems, and so on. HVAC system 114 may include, for example, the heating, ventilating and air-conditioning system used to control the temperature inside the vehicle, or other vehicle climate-control system. Displays 116 may include, for example, one or more indicator lights, LED displays, LCD displays, segment displays or other mechanisms to display vehicle information to the operator and occupants. Displays 116 and user interface 112 may be implemented, for example, as part of a vehicle head unit, or they may be implemented as displays and interfaces other than the head unit. Other vehicle systems 282 may also be included as part of vehicle systems 158.

Battery thermal-management system 118 may include a variety of different systems to cool or heat the battery so that they can be maintained within an optimal temperature range. Technologies used to implement battery thermal-management system 118 may include any of a number of different technologies including, for example, air cooling/heating, liquid cooling/heating, direct refrigerant cooling, phasechange-material cooling/heating, thermoelectric cooling/heating and so on. Battery thermal-management system 118 may provide status and other information to cabin temperature control circuit 210. Other vehicle systems 282 may also be included such as, for example, an electric window shade control system and an automatic window tint adjustment system.

During operation, cabin-temperature control circuit 210 can receive information from various vehicle sensors to determine whether adjustments should be made to vehicle temperature-control parameters such as, for example, target air outlet (TAO) temperatures, fan speeds of the vehicle's climate-control system, other climate-control-system settings, temperature sensor utilization, window shade or window tint settings, and so on. Particularly, cabin-temperature control circuit 210 receives information and evaluates to determine whether heat generated (e.g., radiated, convicted, conducted) by battery thermal-management system 118 is causing unwanted thermal impact on the vehicle cabin. An unwanted thermal impact may include, for example, an unwanted or undesirable rise in temperature in a portion of the cabin or an unwanted or undesirable temperature gradient in the cabin. In some applications, this unwanted thermal impact may arise as a result of heat generated by the battery thermal-management system heating part of the cabin such as, for example, the rear of the cabin (e.g., $2^{nd}$ row or $3^{rd}$ row or both). This unwanted thermal impact might be in adequately addressed by the vehicle climate control system for various reasons. These reasons might include, for example, that the temperature sensor or sensors are located at the front of the vehicle, that weighting among multiple temperature sensors is not allocated to address the issue, or that the target air outlet temperature is set without regard to the unwanted thermal impact.

In various embodiments, communication circuit 201 can be configured to receive data and other information from sensors 152 that is used in determining whether to adjust vehicle temperature-control parameters to offset a thermal impact. Additionally, communication circuit 201 can be used to send commands or other information to various vehicle systems 158 to adjust temperature-control parameters of the vehicle. Communication circuit 201 can be used to transmit and receive information between cabin-temperature control circuit 210 and sensors 152, and cabin-temperature control circuit 210 and vehicle systems 158. Also, sensors 152 may communicate with vehicle systems 158 directly or indirectly (e.g., via communication circuit 201 or otherwise).

Figure 3:
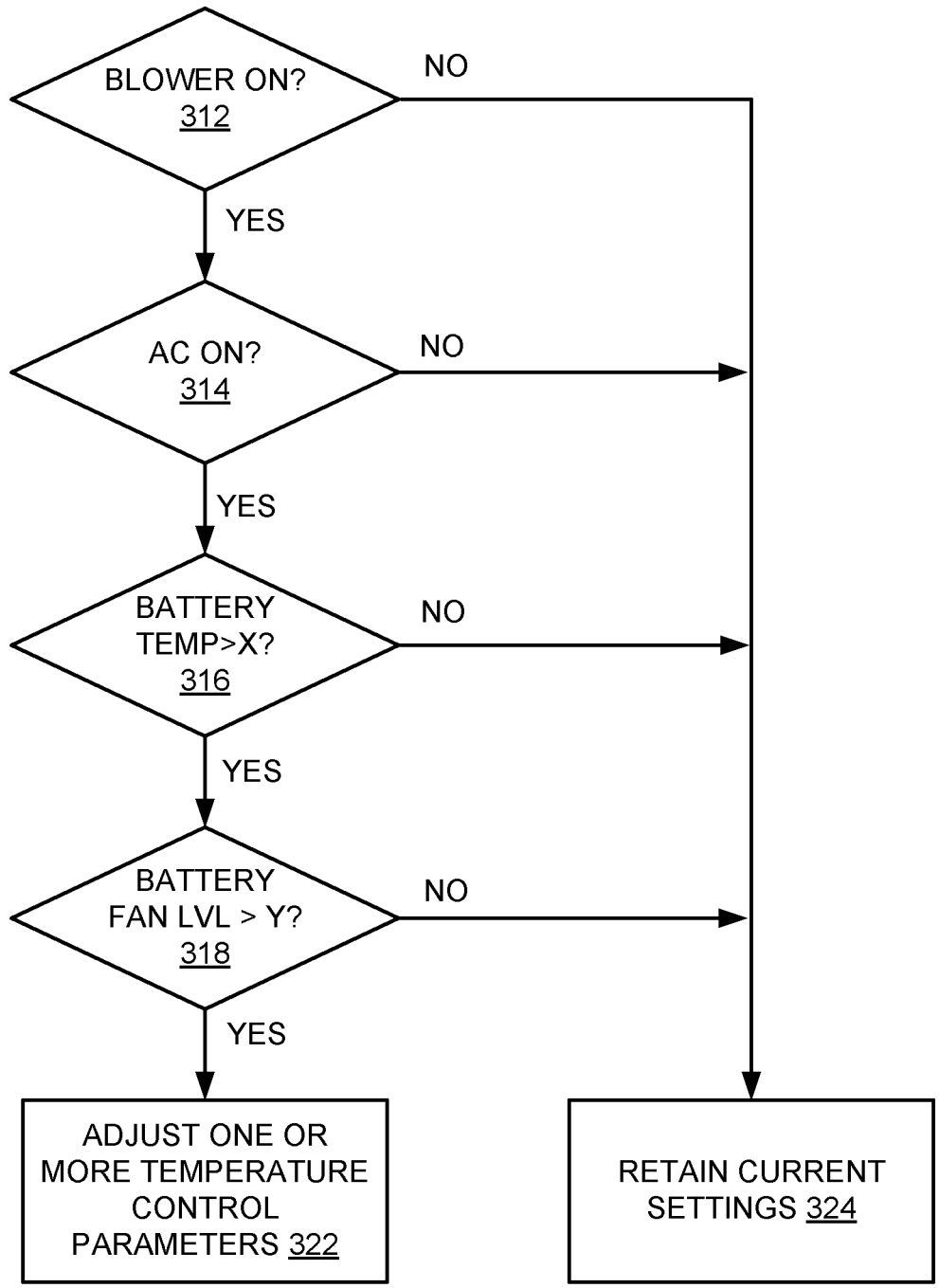
FIG. 3 illustrates an example high-level operation of a system for determining whether to adjust temperature-control parameters in accordance with one embodiment.

FIG. 3 illustrates an example high-level operation of a system for determining whether to adjust temperature-control parameters in accordance with one embodiment. In the example described with respect to FIG. 3, the system evaluates the blower motor status, air conditioning status, battery temperature as compared to a determined threshold and battery thermal-management system settings as compared to a determined threshold.

Referring now to FIG. 3, at operation 312 the system determines whether the blower motor for the HVAC system is turned on. For example, cabin-temperature control circuit 210 may evaluate information obtained from blower motor sensor 222 to determine whether the blower motor is on. Cabin-temperature control circuit 210 may also determine in some embodiments a blower-motor speed such as a fan speed at which an climate-control system fan is operating. If the blower motor is not operating, this indicates that the climate-control system is turned off and not currently being used to cool the vehicle. Accordingly, there is no need to adjust temperature control parameters in this example, and current settings may be retained as illustrated at operation 324. On the other hand, if the blower motor is operating the process continues at operation 314.

At operation 314, the system determines whether the air-conditioning for the vehicle is turned on. For example, the system may receive status information from HVAC system 114 indicating an operational state of the air-conditioning system. If the air-conditioning system is not turned on, this may indicate that the operating environment is such that the cabin need not be cooled to maintain driver convert at the current time. Accordingly, the system retains current vehicle settings as illustrated at operation 324. On the other hand, if the blower motor is operating (operation 312) and the air-conditioning system is running, the system proceeds to operation 316.

In other examples, the system may determine that heating caused by the battery thermal-management system is sufficiently high that one or more temperature control parameters should be adjusted even though the blower or the air-conditioning may be currently turned off. In other words, a temperature gradient or increase in rear cabin temperature may be occurring, or predicted to occur based on the state of the battery thermal-management system, such that temperature control parameters should be adjusted to maintain cabin comfort even though the fan and the air-conditioning system may be currently turned off. In this case, adjusting temperature control parameters may include turning on the air-conditioning system and the blower, for example.

At operation 316, the system checks to determine whether the battery temperature is above a determined threshold. The threshold is determined as a temperature at or above which heat from the battery may transfer sufficient heat to the cabin such that an unwanted temperature impact occurs in the cabin. The temperature threshold may vary depending on vehicle design parameters such as, for example, volume of the cabin, insulation and spacing between the battery and the cabin, and so on. An unwanted temperature impact may be, for example, a determined amount of increase in temperature in the rear portion of the vehicle cabin, or a determined amount of temperature gradient between the front and rear cabin. An increase in temperature in the rear portion of the vehicle cabin might be measured in some applications, for example, as a difference in temperature between the rear portion of the cabin and the climate control settings. For example, the amount of this difference or the amount of temperature gradient may be determined as, for example, 1° F., 2° F., 3° F., 4° F., 5° F., 6° F., 7° F., 8° F., 9° F., 10° F., or as some other temperature difference or gradient.

If the battery temperature is not above the determined threshold, then it is not anticipated that the battery temperature would cause an unwanted temperature impact to the vehicle cabin. Accordingly, current temperature control parameter settings may be maintained as illustrated at operation 324. On the other hand, if the battery temperature is warm enough to cause or potentially cause an unwanted temperature impact to the cabin, the process continues at operation 318.

At operation 318, the system checks the battery thermal-management system to determine whether one or more operating parameters of the battery thermal-management system are above a determined threshold. For example, in the embodiment illustrated in FIG. 3, the system checks the battery fan level to determine whether it is above a determined threshold. As with the battery temperature threshold, the battery thermal management threshold(s) for one or more battery thermal-management system parameters may be determined as a threshold or thresholds at or above which heat from the battery thermal-management system may transfer sufficient heat to the cabin such that an unwanted temperature impact occurs in the cabin. These threshold may also vary depending on vehicle design parameters such as, for example, volume of the cabin, insulation and spacing between the battery and the cabin, and so on. An unwanted temperature impact may be, for example, a determined amount of increase in temperature in the rear portion of the vehicle cabin, or a determined amount of temperature gradient between the front and rear cabin. An increase in temperature in the rear portion of the vehicle cabin might be measured in some applications, for example, as a difference in temperature between the rear portion of the cabin and the climate control settings. For example, the amount of this difference or the amount of temperature gradient may be determined as, for example, 1° F., 2° F., 3° F., 4° F., 5° F., 6° F., 7° F., 8° F., 9° F., 10° F., or as some other temperature difference or gradient.

As another example, the determined threshold for the battery thermal-management system may be a determined operating level of the system. For example, if the battery thermal-management system is operating at above a determined percentage of its maximum cooling capacity, it is operating above threshold. The determined percentage of maximum cooling capacity may be, for example, 30%, 35%, 40%, 45% 50%, 55%, 60%, 65%, 70%, 75%, 80%, 85%, 90%, 95%, and so on. Other percentages above or below these numbers or between these numbers may be chosen as a determined percentage. Again, the determined percentage may be chosen based on the thermal impact of the thermal management system on the vehicle cabin, such as the likelihood that the system may cause an unwanted temperature impact in the cabin.

If the battery thermal-management system operating parameters are within threshold, current temperature-control parameters may be retained as illustrated at operation 324. However, if one or more of the thermal management system operating parameters are above the determined threshold(s), the process progresses to operation 322 where one or more temperature control parameters may be adjusted to address the unwanted thermal impact (e.g., to address it before occurs are to mitigate or decrease it after it occurs).

For example, any one or more of a number of adjustments may be made to the temperature-control parameters of the vehicle to improve rear-passenger comfort despite the unwanted thermal impact of the battery thermal-management system. Here are a few examples. The target air outlet temperature may be lowered from its current setting by the vehicle (e.g., without the user having to lower the set temperature or otherwise adjust the climate control settings) to provide more cool air or cooler air into the cabin. For multizone systems, the target air outlet temperature for the rear climate control system may be lowered independently of, or without lowering, the target air outlet temperature for the front climate control system. Blower speed can be increased to circulate more cool air from the climate control system throughout the cabin. Vent control settings may be adjusted to direct additional cold air to events that serve the rear portion of the cabin such as $2^{nd}$-row or $3^{rd}$-row vents. This may be accomplished by increasing fan speeds for rear vents or by using dampers to redirect airflow and provide a greater airflow to the rear portion of the cabin.

Where multiple temperature sensors (e.g. front and rear, or front, middle and rear sensors) are present in a vehicle, weighting factors applied to the information obtained from these sensors can be adjusted when determining climate control settings including target air outlet temperature settings. For example, where information from multiple temperature sensors is combined to determine a climate control setting, a greater weight factor can be applied to the readings from the rear temperature control sensor or sensors.

Where the vehicle is equipped with electric sunshades on one or more of the rear windows, the system can deploy the sunshades in response to an unwanted thermal impact to lessen the impact of sunlight on rear cabin temperature. Similarly, where a vehicle is equipped with an automatic window-darkening system such as, for example, electrochromatic windows, the system may apply current to one or more of those windows to increase their level of darkness to restrict the amount of sunlight entering the rear cabin.

Where the vehicle is equipped with cooled seats such as a ventilated or air-conditioned seats, the system can activate the cooled seats or increase the cooling amount in response to an unwanted thermal impact to make the passengers more comfortable. As with other embodiments, the system can first determine whether one or more seating positions are occupied before actuating (e.g. activating order turning colder) the cooling function of a cooled seat.

In the above-described examples, the order of the operations may be different from the order described. For example, the system may evaluate blower status before evaluating the air conditioning status. Likewise, the monitored parameters may be continuously monitored in real time while the vehicle is operating to determine whether one or more of the temperature control parameters needs to be adjusted.

Although an HVAC system is generally defined as a heating, ventilating and air-conditioning system, the terms HVAC system and climate control system as used herein may refer to a system that provides heating only, heating and ventilating without air-conditioning, heating and air-conditioning, or heating ventilating and air-conditioning.

Figure 4:
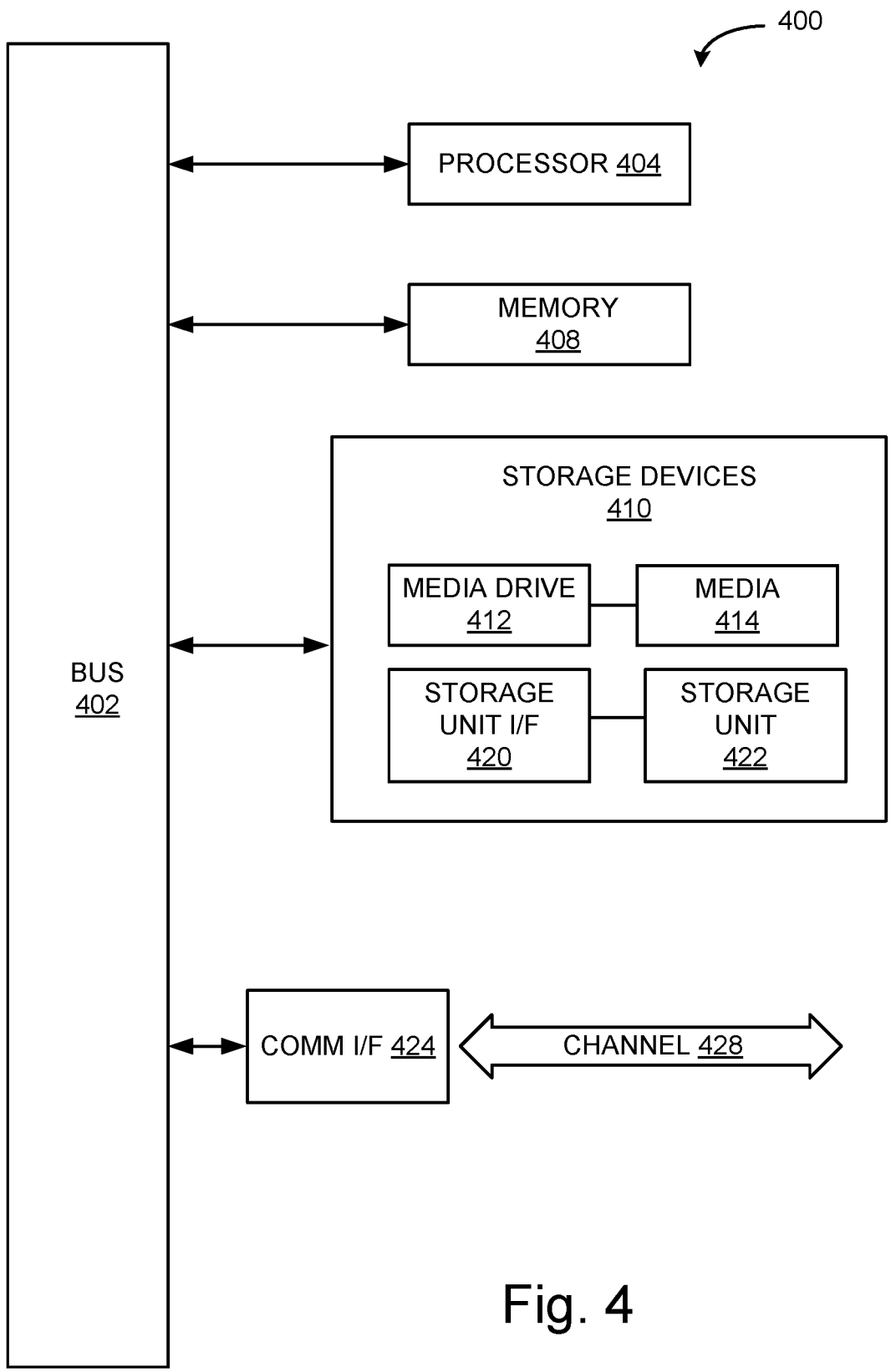
FIG. 4 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 4. Various embodiments are described in terms of this example-computing component 500. After reading this description, it will become apparent to a person skilled in the relevant art how to implement the application using other computing components or architectures.

Referring now to FIG. 4, computing component 400 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example, portable computing devices, and other electronic devices that might include some form of processing capability.

Computing component 400 might include, for example, one or more processors, controllers, control components, or other processing devices. Processor 404 might be implemented using a general-purpose or special-purpose processing engine such as, for example, a microprocessor, controller, or other control logic. Processor 404 may be connected to a bus 402. However, any communication medium can be used to facilitate interaction with other components of computing component 400 or to communicate externally.

Computing component 400 might also include one or more memory components, simply referred to herein as main memory 408. For example, random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid-state drive, a magnetic tape drive, an optical drive, a compact disc (CD) or digital video disc (DVD) drive (R or RW), or other removable or fixed media drive might be provided. Storage media 414 might include, for example, a hard disk, an integrated circuit assembly, magnetic tape, cartridge, optical disk, a CD or DVD. Storage media 414 may be any other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot. Other examples may include a PCMCIA slot and card, and other fixed or removable storage units 422 and interfaces 420 that allow software and data to be transferred from storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 424 may be carried on signals, which can be electronic, electromagnetic (which includes optical) or other signals capable of being exchanged by a given communications interface 424. These signals might be provided to communications interface 424 via a channel 428. Channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for mitigating a thermal impact on a vehicle cabin caused by a battery thermal-management system, the method comprising:
   determining a status of vehicle climate control system;
   determining whether a battery thermal-management system of the vehicle is operating above a determined threshold; and
   if the vehicle climate control system is active and the battery thermal-management system of the vehicle is operating above the determined threshold, adjusting at least one of a plurality of cabin temperature control parameters to increase a cooling effect on the cabin and thereby mitigate a thermal impact of the battery thermal-management system on the vehicle cabin.

2. The method of claim 1, wherein the cabin temperature control parameters comprise at least one of a target air outlet temperature, a climate-control-system blower speed, a climate-control-system, cooled seat setting, a window shade setting and an electrochromatic window setting.

3. The method of claim 1, wherein determining the status of the vehicle climate control system comprises determining at least one of whether a blower is turned on and whether a vehicle air conditioning system is turned on.

4. The method of claim 1, wherein determining the status of the vehicle climate control system comprises determining whether the vehicle climate control system is being used to cool the vehicle.

5. The method of claim 1, wherein determining whether a battery thermal-management system of the vehicle is operating above a determined threshold comprises determining whether a battery fan level is above a determined fan speed.

6. The method of claim 1, further comprising determining whether a temperature of a vehicle battery pack is above a determined threshold temperature and not adjusting the plurality of cabin temperature control parameters unless the vehicle battery pack is above the determined threshold temperature.

7. The method of claim 1, wherein the determined threshold for the battery thermal-management system comprises a threshold at or above which heat from the battery thermal-management system transfers sufficient heat to the cabin to cause an unwanted temperature impact to occur in the cabin.

8. The method of claim 7, wherein the unwanted temperature impact comprises a temperature gradient between a front portion of the vehicle and a rear portion of the vehicle greater than a determined temperature differential amount.

9. The method of claim 1, wherein the determined threshold for the battery thermal-management system comprises a determined operating level of the battery thermal-management system.

10. The method of claim 1, further comprising determining whether a rear portion of the cabin of the vehicle is occupied by one or more passengers and adjusting the at least one of the one or more cabin temperature control parameters mitigate a thermal impact of the battery thermal-management system on a rear portion of the vehicle cabin only if the rear portion of the cabin of the vehicle is occupied by one or more passengers.

11. A system for mitigating a thermal impact on a vehicle cabin caused by a battery thermal-management system, the system comprising a cabin temperature control circuit comprising a communications interface coupled to receive information from vehicle components, the cabin temperature control circuit configured to determine a status of vehicle climate control system, determine whether a battery thermal-management system of the vehicle is operating above a determined threshold, and if the vehicle climate control system is active and the battery thermal-management system of the vehicle is operating above the determined threshold, adjust at least one of a plurality of cabin temperature control parameters to increase a cooling effect on the cabin and thereby mitigate a thermal impact of the battery thermal-management system on the vehicle cabin.

12. The system of claim 11, wherein the cabin temperature control parameters comprise at least one of a target air outlet temperature, a climate-control-system blower speed, a climate-control-system, cooled seat setting, a window shade setting and an electrochromatic window setting.

13. The system of claim 11, wherein determining the status of the vehicle climate control system comprises determining at least one of whether a blower is turned on and whether a vehicle air conditioning system is turned on.

14. The system of claim 11 wherein determining the status of the vehicle climate control system comprises determining whether the vehicle climate control system is being used to cool the vehicle.

15. The system of claim 11, wherein determining whether a battery thermal-management system of the vehicle is operating above a determined threshold comprises determining whether a battery fan level is above a determined fan speed.

16. The system of claim 11, wherein the cabin temperature control circuit is further configured to determine whether a temperature of a vehicle battery pack is above a determined threshold temperature and not adjusting the plurality of cabin temperature control parameters unless the vehicle battery pack is above the determined threshold temperature.

17. The system of claim 11, wherein the determined threshold for the battery thermal-management system comprises a threshold at or above which heat from the battery thermal-management system transfers sufficient heat to the cabin to cause an unwanted temperature impact to occur in the cabin.

18. The system of claim 17, wherein the unwanted temperature impact comprises a temperature gradient between a front portion of the vehicle and a rear portion of the vehicle greater than a determined temperature differential amount.

19. The system of claim 11, wherein the determined threshold for the battery thermal-management system comprises a determined operating level of the battery thermal-management system.

20. The system of claim 11, wherein the cabin temperature control circuit is further configured to determine whether a rear portion of the cabin of the vehicle is occupied by one or more passengers and adjusting the at least one of the one or more cabin temperature control parameters mitigate a thermal impact of the battery thermal-management system on a rear portion of the vehicle cabin only if the rear portion of the cabin of the vehicle is occupied by one or more passengers.

21. The system of claim 11, wherein the vehicle components comprise at least one of a vehicle climate control system and the battery thermal management system.

22. A vehicle, comprising
a battery pack, comprising one or more batteries;
a battery thermal management system to control the temperature of one or more batteries of the battery pack;
a climate control system;
a cabin temperature control circuit comprising a communications interface coupled to receive information from the climate control system and the battery thermal management system, the cabin temperature control circuit configured to determine a status of vehicle climate control system, determine whether a battery thermal-management system of the vehicle is operating above a determined threshold, and if the vehicle climate control system is active and the battery thermal-management system of the vehicle is operating above the determined threshold, adjust at least one of a plurality of cabin temperature control parameters to increase a cooling effect on the cabin and thereby mitigate a thermal impact of the battery thermal-management system on the vehicle cabin.

23. The method of claim 10, wherein the rear portion of the cabin of the vehicle comprises a second-row seating area of the vehicle or a third-row seating area of the vehicle or both.

24. The system of claim 20, wherein the rear portion of the cabin of the vehicle comprises a second-row seating area of the vehicle or a third-row seating area of the vehicle or both.

* * * * *